United States Patent
Wang et al.

(10) Patent No.: US 9,528,880 B2
(45) Date of Patent: Dec. 27, 2016

(54) METHOD AND SYSTEM FOR GAS TEMPERATURE MEASUREMENT

(71) Applicant: General Electric Company, Schenectady, NY (US)

(72) Inventors: Guanghua Wang, Clifton Park, NY (US); Nirm Velumylum Nirmalan, Liberty Township, OH (US); Ronald Scott Bunker, Niskayuna, NY (US); Todd Garrett Wetzel, Niskayuna, NY (US); Robert Michael Zacharias, Fountain Inn, SC (US); Shawn David Wehe, Niskayuna, NY (US); Robert David Briggs, West Chester, OH (US)

(73) Assignee: General Electric Company, Niskayuna, NY (US)

( * ) Notice: Subject to any disclaimer, the term of this patent is extended or adjusted under 35 U.S.C. 154(b) by 741 days.

(21) Appl. No.: 13/969,186

(22) Filed: Aug. 16, 2013

(65) Prior Publication Data

US 2015/0049786 A1     Feb. 19, 2015

(51) Int. Cl.
    *G01J 5/00*     (2006.01)
    *G01K 1/14*     (2006.01)
    (Continued)

(52) U.S. Cl.
    CPC ............ *G01J 5/10* (2013.01); *G01J 5/0014* (2013.01); *G01J 5/0887* (2013.01); *G01J 5/60* (2013.01); *G01M 15/14* (2013.01)

(58) Field of Classification Search
None
See application file for complete search history.

(56) References Cited

U.S. PATENT DOCUMENTS

| 2009/0268779 A1* | 10/2009 | Hotta | G01K 1/10 374/179 |
| 2009/0285259 A1* | 11/2009 | Allen | G01J 5/0022 374/130 |

(Continued)

FOREIGN PATENT DOCUMENTS

| JP | 10153488 A | 6/1998 |
| JP | 2008249462 A | 10/2008 |

OTHER PUBLICATIONS

L. P. Goss, et al., Thin-Filament Pyrometry: A Novel Thermometric Technique for Combusting Flows, Transactions of the ASME, 1989, 7 pages, vol. 111, Issue 46, Systems Research Laboratories, Dayton, OH.

(Continued)

*Primary Examiner* — Erica Lin
(74) *Attorney, Agent, or Firm* — John P. Darling

(57) ABSTRACT

A temperature measurement system includes a plurality of filaments. The plurality of filaments are configured to emit thermal radiation in a relatively broad and substantially continuous wavelength band at least partially representative of a temperature of the plurality of filaments. A first and second portion of the filaments has a differing first and a second diameter and/or emissivity, respectively. The system also includes a detector array configured to generate electrical signals at least partially representative of the thermal radiation received from the filaments. The system further includes a controller communicatively coupled to the detector array configured to transform the first electrical signals to a first temperature indication at least partially as a function of the first diameter and/or first emissivity and transform the second electrical signals to a second temperature indication at least partially as a function of the second diameter and/or emissivity.

23 Claims, 11 Drawing Sheets

(51) Int. Cl.
*G01K 13/00* (2006.01)
*G01K 3/00* (2006.01)
*G01J 5/10* (2006.01)
*G01M 15/14* (2006.01)
*G01J 5/08* (2006.01)
*G01J 5/60* (2006.01)

(56) References Cited

U.S. PATENT DOCUMENTS

| 2011/0222582 A1* | 9/2011 | Subramanian | F01D 17/085 |
| | | | 374/179 |
| 2011/0268149 A1* | 11/2011 | Chillar | G01J 5/0014 |
| | | | 374/124 |

OTHER PUBLICATIONS

Peter B. Kuhn, et al., Soot and Thin-Filament Pyrometry Using a Color Digital Camera, Proceedings of the Combustion Institute, pp. 743-750, 2011, vol. 33, Science Direct, Elsevier.

Jun Ji, et al., Emission Spectroscopy Based Temperature Sensor for On-Line Non-Intrusive Gas Turbine Inlet Temperature Measurement, Proceedings of JPGC'01, 2001 International Joint Power Generation Conference, 10 pages, 2001, ASME.

Tzong H. Chen, et al., Conditional Velocity Measurements at the Base of Turbulent, Lifted Jet Flames, Systems Research Laboratories, Inc., 7 pages, 1990, AIAA/SAE/ASME/ASEE.

* cited by examiner

LINE PATTERN CONFIGURATION

SCANNING WIRE CONFIGURATION

GRID PATTERN CONFIGURATION

INSIDE BL CONFIGURATION

METHOD AND SYSTEM FOR GAS TEMPERATURE MEASUREMENT

BACKGROUND

The field of the disclosure relates generally to gas temperature measurement, and more specifically, to methods and a system for measuring gas temperature in harsh environments based on radiation thermometry using thin filaments.

At least some known turbomachines, such as gas turbine engines, include a plurality of rotating turbine blades or buckets that channel high-temperature fluids, i.e., combustion gases, through the gas turbine engines. Known turbine buckets are typically coupled to a wheel portion of a rotor within the gas turbine engine and cooperate with the rotor to form a turbine section. The turbine buckets are typically spaced circumferentially in a row extending about the rotor. Moreover, known turbine buckets are arranged in axially-spaced rows that are separated by a plurality of stationary nozzle segments that channel the fluid flowing through the engine towards each subsequent row of rotating buckets. Each row of nozzle segments, in conjunction with an associated row of turbine buckets, is usually referred to as a turbine stage and most known turbine engines include a plurality of turbine stages. The arrangement of turbine buckets and nozzle segments is referred to as a hot gas path.

Such known turbine buckets and nozzle segments in the hot gas path may wear over time. For example, such hot gas path components may exhibit stress-related cracking induced by temperatures at or above predetermined parameters. Therefore, many known gas turbine engines include temperature monitoring systems that provide operational temperature data in real time, i.e., at the time of measurement. At least some of these known temperature monitoring systems monitor and record temperature data as an input to adjust operation, e.g., the firing rate of the gas turbine engine, i.e., the rate and/or ratio of fuel and air being combusted in the engine. In some cases, the temperature data may be used as an input into certain protective features of the engine.

Measuring gas temperatures in a combusting flame or harsh environment downstream of a combustor, i.e., the hot gas path may include many sources of inaccuracy and non-repeatability. Many of those relate to physical properties of the temperature measurement mechanisms positioned in or proximate the flow of the hot combustion gases and/or proximate the high-temperature gas turbine components. For example, such detection mechanisms include thermocouples and gas sampling probes for point temperature measurements. However, these temperature measurement mechanisms do not account for radiation effects prominent in the hot gas path. Also, these temperature measurement mechanisms do not provide accurate temperature distribution profiles and alternative computational extrapolations and approximations must be used to facilitate spatial-resolution of the temperature profiles, albeit, with some inaccuracies induced by the modeling techniques and approximations used. At least some other known temperature measurement mechanisms include laser diagnostic techniques, e.g., laser Rayleigh scattering, laser Raman scattering, and planar laser induced fluorescence. However, these temperature measurement mechanisms are difficult to implement for temperature control of the gas turbine engine.

Therefore, to overcome the deficiencies of known temperature measurement mechanisms with respect to gas temperature profiles and near-wall temperature measurements in high-temperature and high-pressure environments, gas turbine manufacturers may elect to fabricate, install, and run hot gas components with greater thermal margins to extend the useful service life of such components. Increasing thermal margins typically manifests as increased wall thicknesses and other ruggedizing methods. Such increased ruggedness of those components increases the costs of production and increases a potential for premature reductions in service life due to excessive temperature profiles induced in the walls of the components during operations that typically include large-scale temperature changes, e.g., startups, shutdowns, and load changes. Increasing thermal margins during gas turbine operation is typically manifested as increased cooling flow rates. Increased cooling flow usage for those components increases the fuel consumption and decreases gas turbine efficiency.

BRIEF DESCRIPTION

In one embodiment, a temperature measurement system is provided. The temperature measurement system includes a plurality of filaments. The plurality of filaments are configured to emit thermal radiation in a relatively broad and substantially continuous wavelength band at least partially representative of a temperature of the plurality of filaments. At least a first portion of the plurality of filaments has at least one of a first diameter and a first emissivity. A second portion of the plurality of filaments has at least one of a second diameter that is different from the first diameter and a second emissivity. The temperature measurement system also includes an optical system configured to receive at least a portion of the thermal radiation emitted from the plurality of filaments. The optical system includes a detector array configured to generate first electrical signals at least partially representative of the thermal radiation received from the first portion of the plurality of filaments and generate second electrical signals at least partially representative of the thermal radiation received from the second portion of the plurality of filaments. The temperature measurement system further includes a controller communicatively coupled to the detector array. The controller is configured to transform the first electrical signals to a first temperature indication at least partially as a function of at least one of the first diameter and the first emissivity and transform the second electrical signals to a second temperature indication at least partially as a function of the second diameter and the second emissivity.

In another embodiment, a method of temperature measurement is provided. The method includes positioning a plurality of filaments in a flow path of a fluid. At least a first portion of the plurality of filaments has at least one of a first diameter and a first emissivity. At least a second portion of the plurality of filaments has at least one of a second diameter that is different from the first diameter and a second emissivity. The method also includes positioning an optical system proximate the plurality of filaments. The method further includes transmitting thermal radiation from the plurality of filaments to the optical system. The thermal radiation is at least partially representative of a temperature of the plurality of filaments. The method also includes generating first electrical signals at least partially representative of the thermal radiation received from the first portion of the plurality of filaments and generating second electrical signals at least partially representative of the thermal radiation received from the second portion of the plurality of filaments. The method further includes transforming the first electrical signals to a first temperature indication at least partially as a function of at least one of the first diameter and the first emissivity and transforming the second electrical signals to a second temperature indication at least partially as a function of the second diameter and the second emissivity. The method also includes transmitting the first and second temperature indications to a processor.

In yet another embodiment, a turbomachine is provided. The turbomachine includes a combustor configured to generate a flow of combustion products. The turbomachine also includes a turbine downstream in serial flow communication with the combustor. The combustor and the turbine at least partially define at least a portion of a gas path configured to channel the flow of combustion products. The turbomachine further includes a temperature measurement system positioned at least partially in the gas path. The temperature measurement system includes a plurality of filaments. The plurality of filaments are configured to emit thermal radiation in a relatively broad and substantially continuous wavelength band at least partially representative of a temperature of the plurality of filaments. At least a first portion of the plurality of filaments has at least one of a first diameter and a first emissivity. At least a second portion of the plurality of filaments has at least one of a second diameter that is different from the first diameter and a second emissivity. The temperature measurement system also includes an optical system configured to receive at least a portion of the thermal radiation emitted from the plurality of filaments. The optical system includes a detector array configured to generate first electrical signals at least partially representative of the thermal radiation received from the first portion of the plurality of filaments and generate second electrical signals at least partially representative of the thermal radiation received from the second portion of the plurality of filaments. The temperature measurement system further includes a controller communicatively coupled to the detector array. The controller is configured to transform the first electrical signals to a first temperature indication at least partially as a function of at least one of the first diameter and first emissivity and transform the second electrical signals to a second temperature indication at least partially as a function of at least one of the second diameter and the second emissivity.

DRAWINGS

These and other features, aspects, and advantages of the present disclosure will become better understood when the following detailed description is read with reference to the accompanying drawings in which like characters represent like parts throughout the drawings, wherein.

Figure 1:
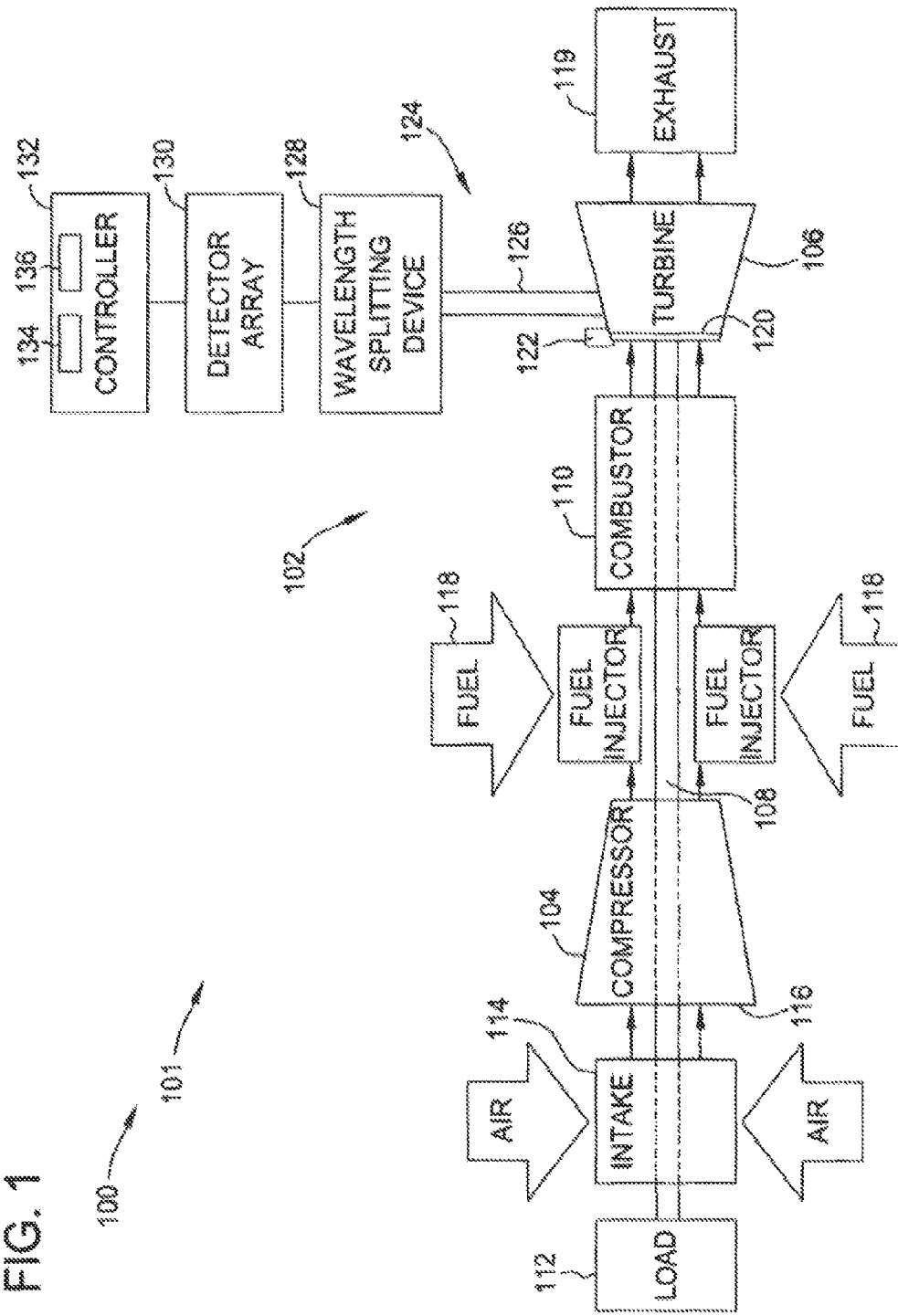
FIG. 1 is a schematic block diagram of an exemplary gas temperature measurement system implemented in an exemplary turbomachine.
Figure 2:
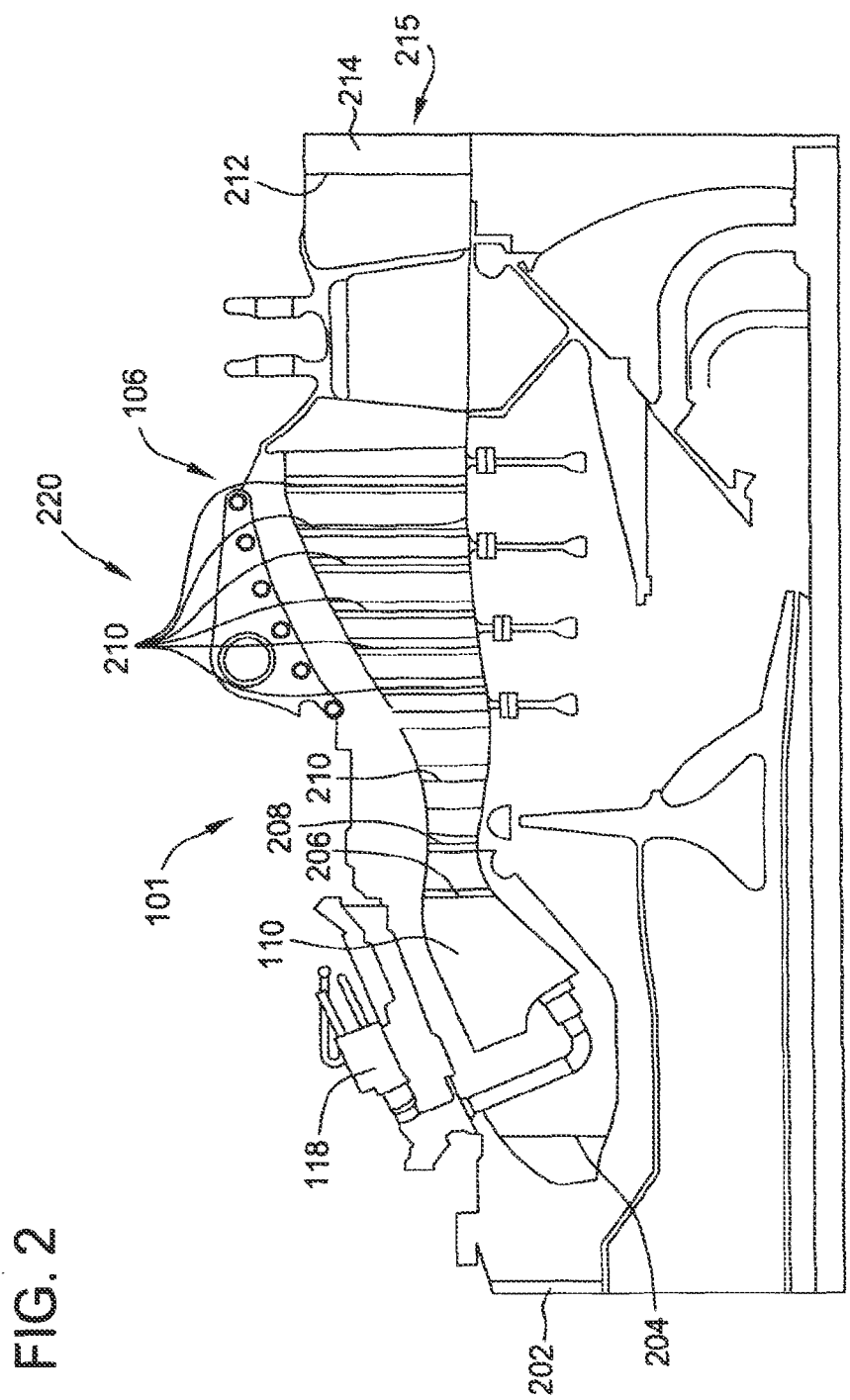
FIG. 2 is a side cross-sectional view of a portion of the turbomachine shown in FIG. 1.
Figure 8:
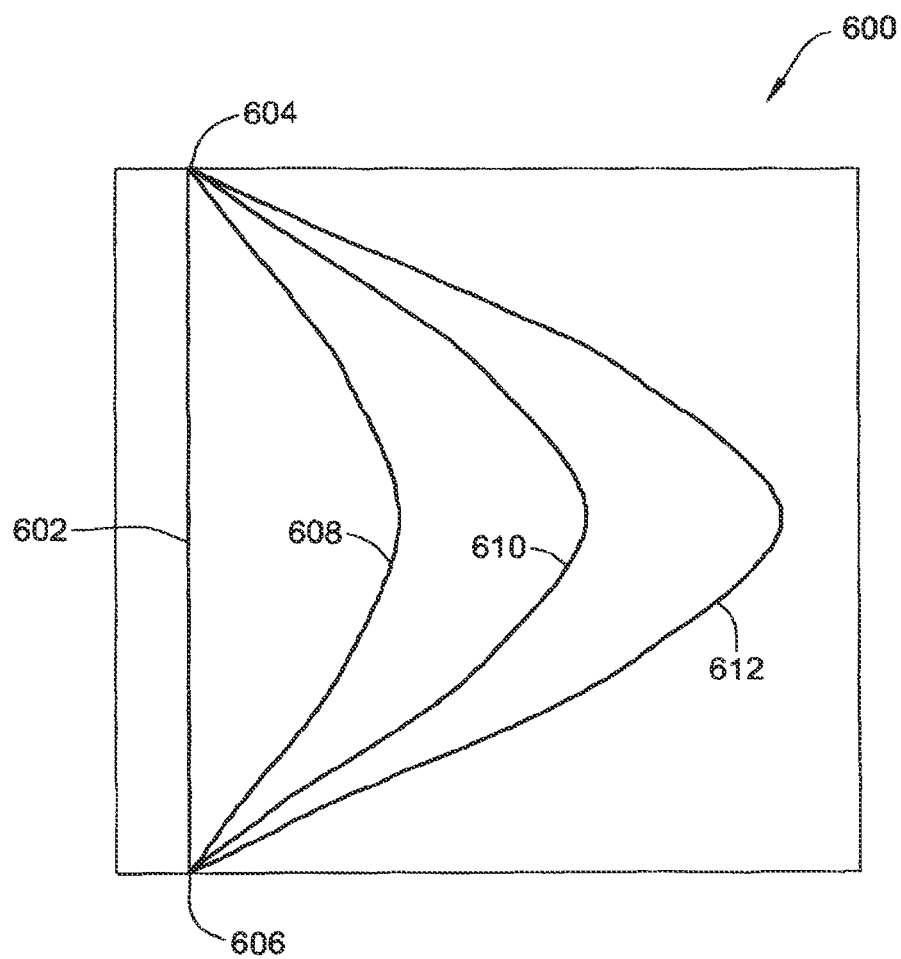
Figure 9:
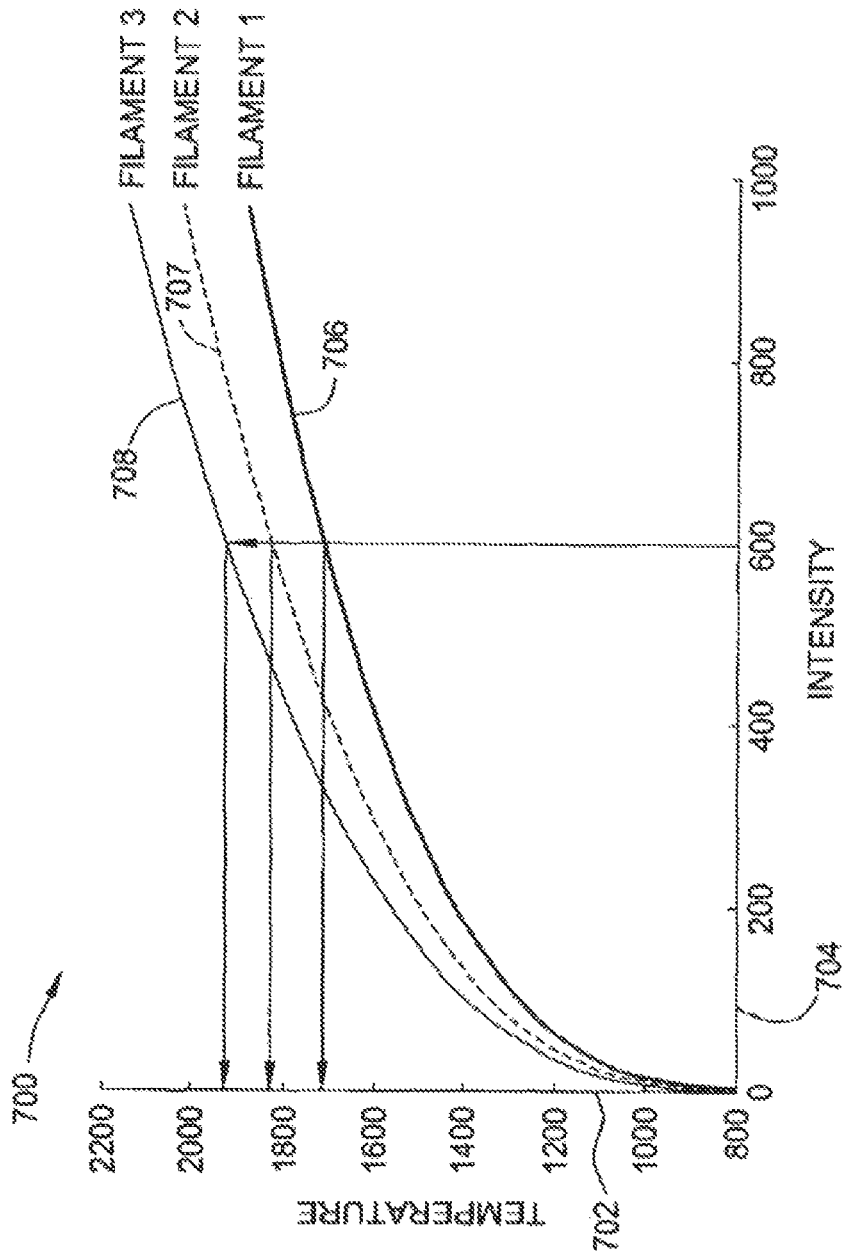
Figure 10:
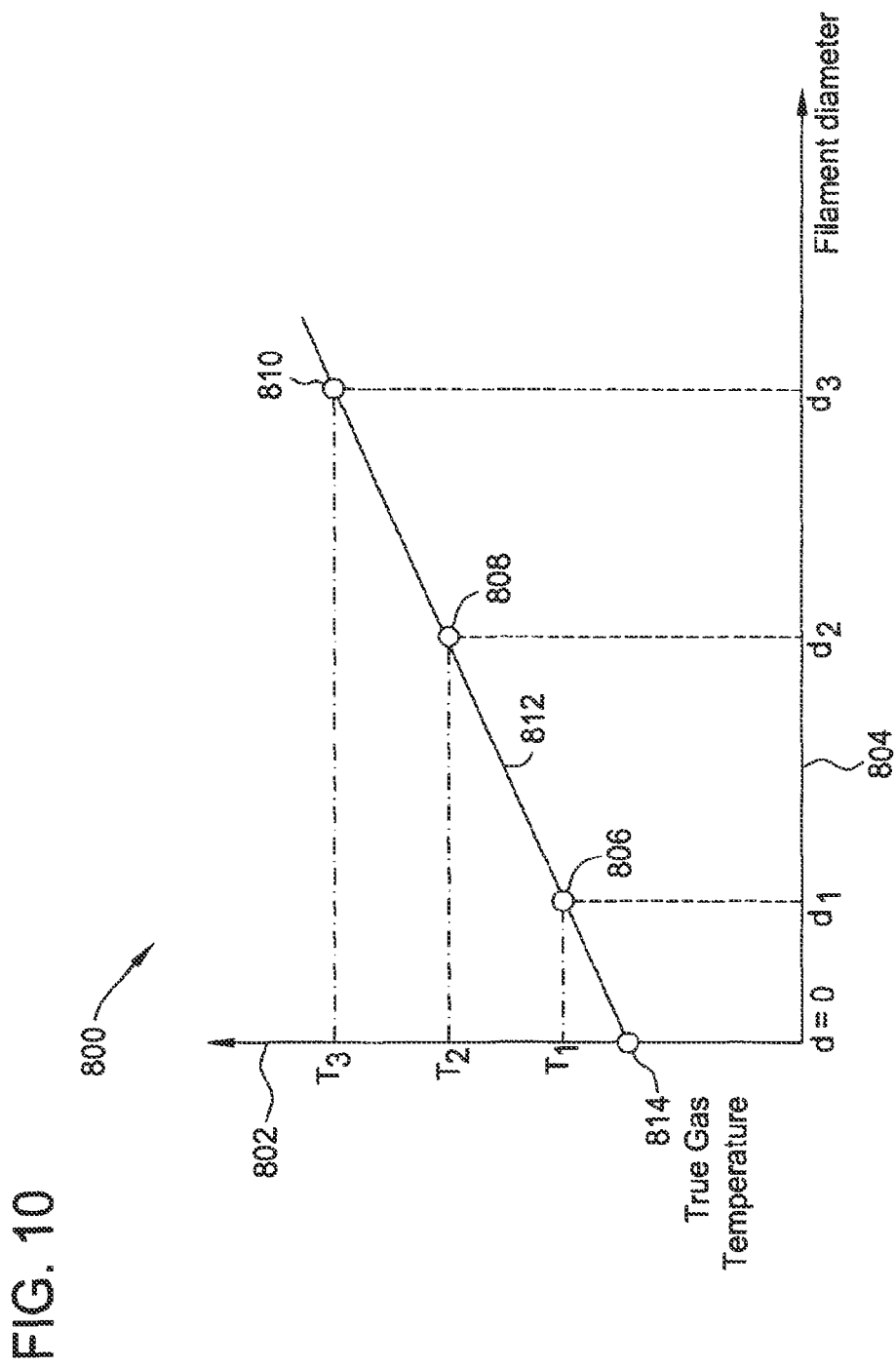
Figure 11:
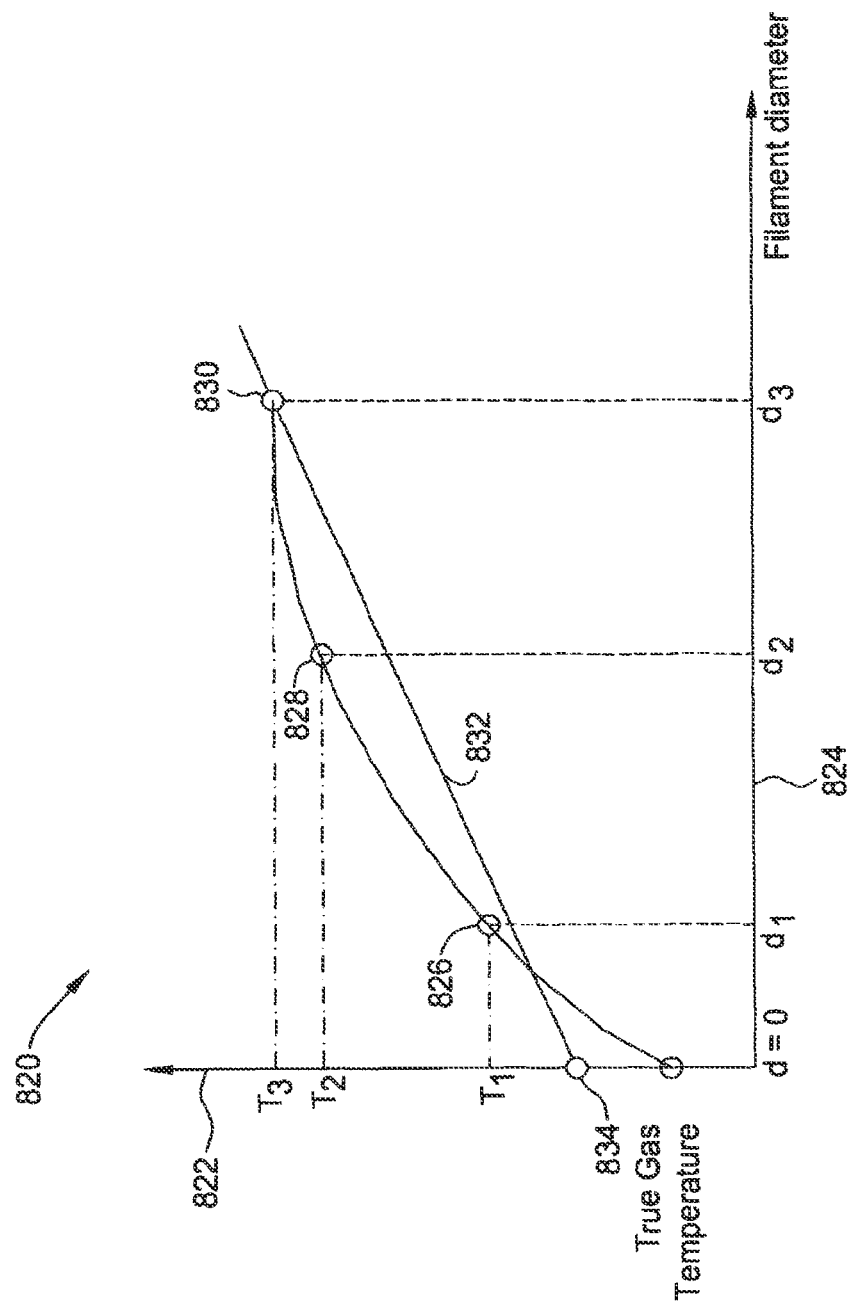
Figure 12:
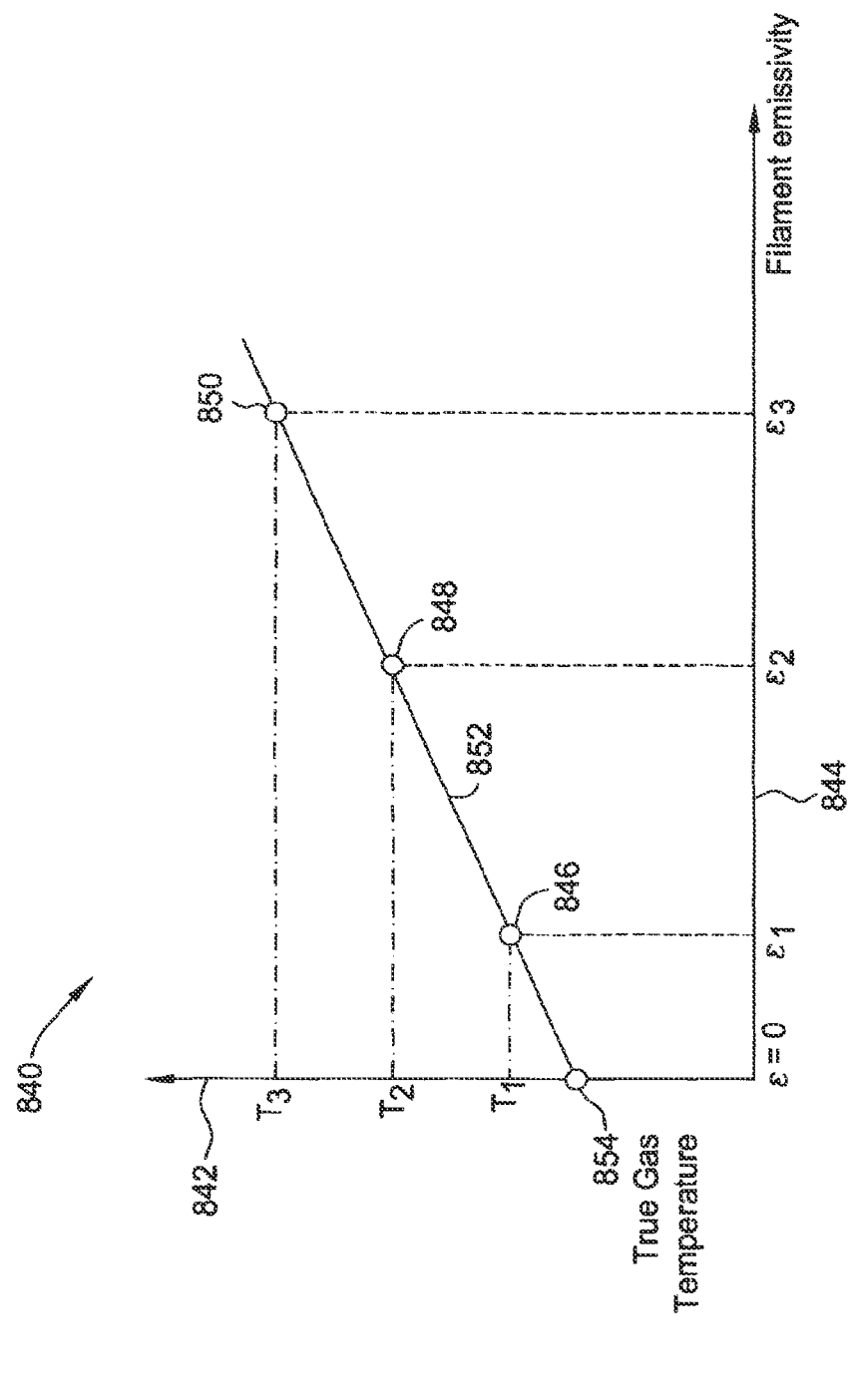
Figure 13:
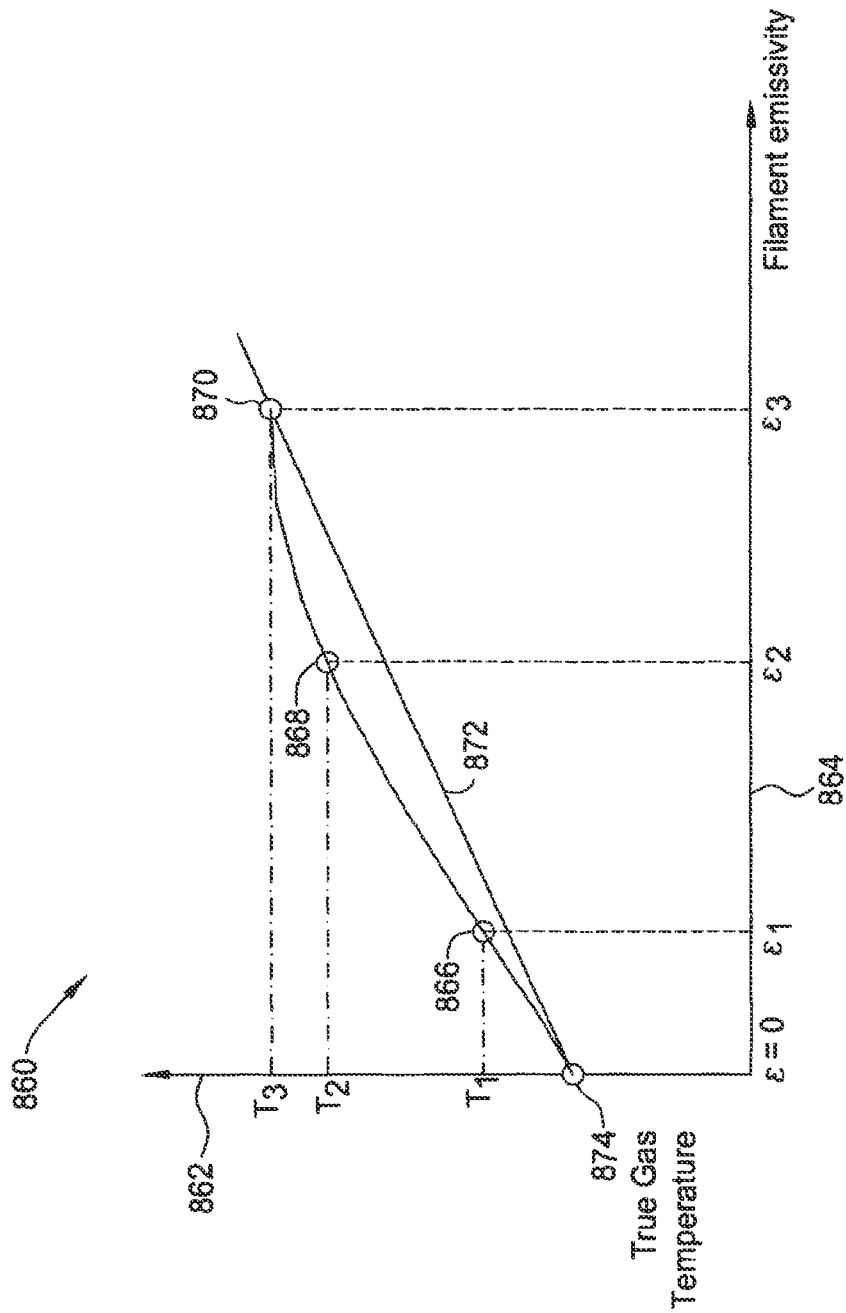
Figure 14:
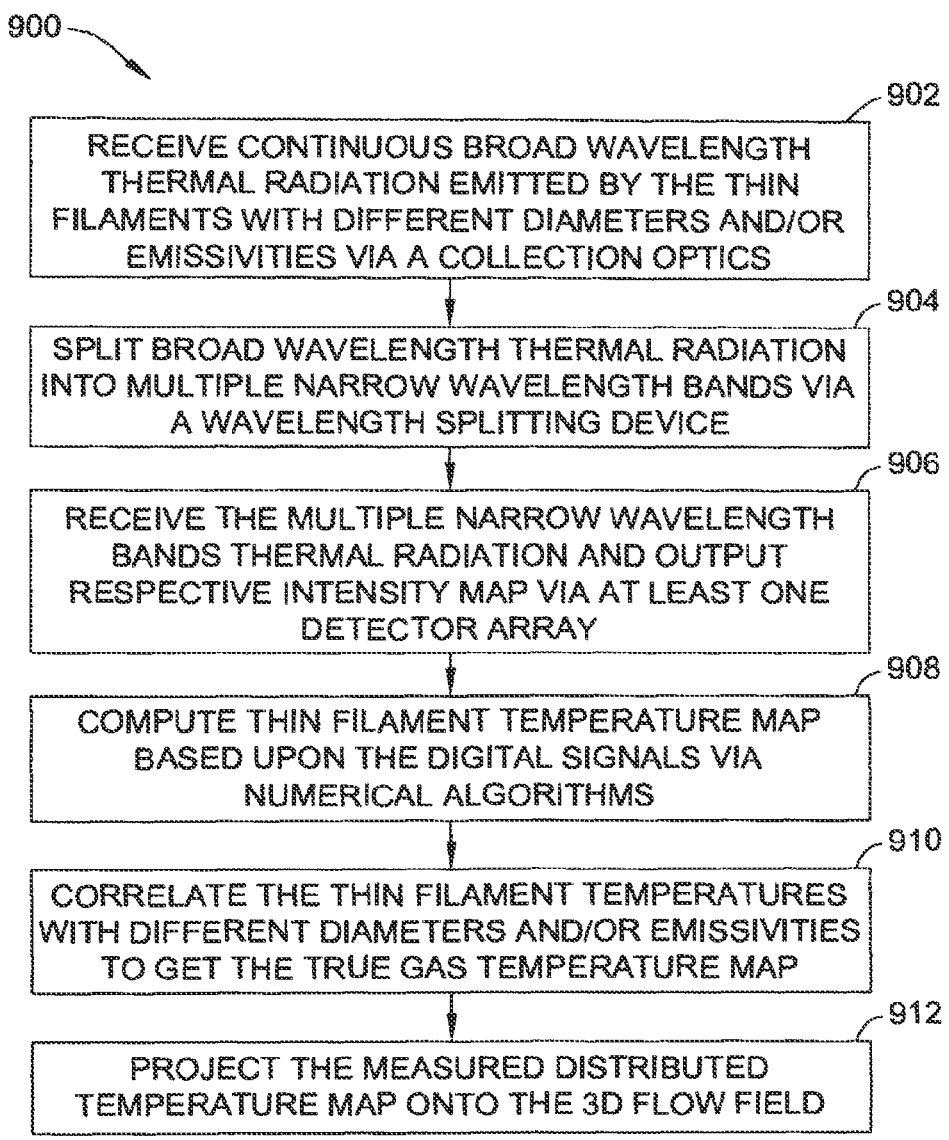

FIGS. 4, 5, 6, and 7 illustrate placement configurations of filaments that may be used to achieve multiple spatial line temperature distributions within the gas temperature measurement system shown in FIG. 1;

FIG. 8 is an illustration of a plurality of filament configurations for monitoring a 2D temperature field of the turbomachine shown in FIGS. 1 and 2;

FIG. 9 is a graph showing exemplary calibration curves to convert sensor signals to a temperature of filaments shown in FIGS. 4-7;

FIG. 10 is a graph showing an exemplary linear method of calculating a temperature of a gas with varying filament diameters using the gas temperature measurement system shown in FIG. 1;

FIG. 11 is a graph showing an exemplary nonlinear method of calculating a temperature of a gas with varying filament diameters using the gas temperature measurement system shown in FIG. 1;

FIG. 12 is a graph showing an exemplary linear method of calculating a temperature of a gas with varying filament emissivities using the gas temperature measurement system shown in FIG. 1;

FIG. 13 is a graph showing an exemplary nonlinear method of calculating a temperature of a gas with varying filament emissivities using the gas temperature measurement system shown in FIG. 1; and FIG. 14 is a flow chart for a method generating a three-dimensional (3D) map of temperature in a volume of interest of the turbomachine shown in FIGS. 1 and 2.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The gas temperature measurement systems described herein include a method and systems of measuring gas temperatures using thin filament pyrometry that provide a cost-effective and reliable means of monitoring process parameters in heretofore difficult areas of components that experience harsh environmental conditions. As such, the gas temperature measurement systems described herein provide a cost-effective method for monitoring temperatures of components in high temperature and/or high pressure environments. Specifically, the devices, systems, and methods described herein include temperature measuring filaments of varying diameters and/or emissivity distributed in a gas turbine engine. The gas temperature measurement systems described herein determine a temperature measurement for the plurality of filaments as a function of the associated diameters and/or emissivity and then correlate such temperature determinations to determine a gas temperature of the portion of the gas turbine engine associated with the filaments. Therefore, the methods and systems described herein facilitate measuring two and three dimensional temperature maps of gas turbine hot gas path components during operation. In addition, the gas temperature measurement systems described herein facilitate calibrating the temperature sensors and generating accurate temperature indications without using radiation correction factors.

FIG. 1 is a schematic view of an industrial facility 100 that includes a turbomachine, and more specifically, a gas turbine engine system 101. In the exemplary embodiment, gas turbine engine system 101 includes a gas temperature measurement system 102. Gas temperature measurement system 102 may be used in any other facilities and with any other apparatus and processes that use gas temperature measurements, e.g., without limitation, power and auxiliary boilers, other turbomachinery, chemical processing plants, including, without limitation, refining plants, and solar collectors.

In the exemplary embodiment, gas turbine engine system 101 includes a compressor 104 and turbine 106 mounted on a common shaft 108 and coupled in a serial flow arrangement with a combustor 110 positioned between them. A load 112, such as, but not limited to, a generator, a pump, and a compressor is also drivingly coupled to shaft 108.

During operation, air or other oxygen containing working fluid is received at an air intake 114 and directed to an inlet 116 of compressor 104, compressed air is then directed to combustor 110, where fuel 118 is added to the flow of compressed air and ignited, generating a flow of relatively hot, high-energy gases. The gases are directed through turbine 106, where work is extracted to drive compressor 104 and load 112. The exhausted gases are expelled through an exhaust section 119.

Gas temperature measurement based on radiation thermometry using thin filaments facilitates measuring gas temperatures in hot or reacting flows in the range of approximately 500° K to approximately 2200° K with an uncertainty of approximately 50° K, a precision of approximately 1° K, a spatial resolution of approximately 50 microns, and temporal resolution of approximately 0.1 micro-sec. The thin-filament is typically in the range between approximately 10 microns (µ) and approximately 5.0 millimeters (mm) in diameter. Thin filaments may be formed of various materials, for example, silicon-carbide (SiC), which may be selected for its good mechanical strength, modulus and fatigue strength under high temperature and pressure harsh environments, relatively constant emissivity, resistance to oxidation and catalytic effects, and wide availability. Other materials can also be used as the thin-filaments, for example, but not limited to sapphire, fused silica, tungsten, graphite, and stainless steel. When used for gas temperature measurements, the filament is placed in the hot gas flows and the sensor detects thermal radiation emissions from the filament. A temperature of the filament is calculated from a calibration curve (not shown in FIG. 1) and the gas temperature is then inferred through the energy balance between the filament, gas flow and surrounding environment. To measure gas temperature inside running gas turbines, the filament is placed in the hot gas flows, e.g., combustor, stage one nozzle (S1N) and stage one blade (S1B). Emissions from the filament are collected through view ports or windows on the gas turbine casing. A sensor detects the emissions and transforms them into digital signals. Filament temperature is calculated from the calibration curve.

Therefore, while gas turbine engine system 101 is in operation, gas temperature measurement system 102 monitors one or more temperatures of the gases passing through gas turbine engine system 101. Gas temperature measurement system 102 includes a plurality of filaments 120 positioned within a flow path of the hot high-energy gases generated in combustor 110. In various embodiments, filaments 120 may be positioned at for example, but not limited to, an inlet to combustor 110, an outlet from combustor 110, an inlet to turbine 106, and an outlet from turbine 106. Filaments 120 may also be coupled to various components operating in the gas path of gas turbine engine system 101, such as, but not limited to, blades, vanes, cooling apertures, and stationary surfaces, e.g., nozzles, and rotatable surfaces, e.g., buckets and blades, and turbine exhausts.

In the exemplary embodiment, filaments 120 are approximately 5.0 millimeters (mm) or less in diameter, e.g., without limitation, in the range between approximately 10µ and approximately 4 mm in diameter. Also, in the exemplary embodiment, filaments 120 have an emissivity within a range between approximately 0.3 and approximately 1.0. Alternatively, filaments 120 have any dimensions and emissivities that enable operation of gas temperature monitoring system 102 as described herein. By mounting the thin filaments in different parts of the hot-gas path (HGP) flow fields, using a thin filament grid, flying thin filaments, scanning single filament or grid, and tufts, the gas temperature distribution can be obtained in two or three dimensions.

Also, in the exemplary embodiment, filaments 120 are configured in a plurality of portions (not shown in FIG. 1) such that each portion includes filaments 120 having a different diameter, a different emissivity, or a combination of both, than those filaments 120 in other portions. Using such filaments 120 with different diameters and/or emissivities improves gas temperature measurements in gas turbine engine system 101 over similar systems with filaments 120 having substantially similar diameters and emissivities.

In various embodiments, gas temperature measurement system 102 also includes a filament controller 122 communicatively coupled to an optical system 124. Filament controller 122 is configured to control a position and/or tension of filaments 120. In various embodiments, filaments 120 may be translated across the gas path using a scanning mechanism portion (not shown separately) of filament controller 122 to obtain two-dimensional (2D) temperature profile information in the gas path or a tension of filaments 120 may be reduced to allow slack in filaments 120. Such slack may permit filaments 120 to be exposed to a 2D area of the flow through the gas path permitting 2D determination of a temperature profile in the gas path. In other embodiments, filament controller 122 is not used, for example, in an application where filaments 120 are fixed in position and at a constant tension.

In the exemplary embodiment, optical system 124 includes sufficient collection optics, i.e., optical system 124 includes an optical component 126 fabricated of a material that is at least partially transparent to thermal radiation emitted by filaments 120 to collect the thermal radiation light from thin filaments 120. Optical component 126 is any device that enables operation of optical system 124 and gas temperature measurement system 102, including, without limitation, windows, lens, and mirrors. Optical system 124 also includes a wavelength splitting device 128 that is configured to split broad wavelength band thermal radiation signals into a plurality of relatively narrow band thermal radiation signals. Optical system 124 further includes at least one detector array 130 that is configured to convert the relatively narrow band thermal radiation signals to digital signals.

Also, in the exemplary embodiment, gas temperature measurement system 102 includes a controller 132 that includes a processor 134 and a memory 136. Memory 136 includes one or more predetermined algorithms configured, when executed by processor 134 to convert the digital signals into temperature indication based on a predetermined calibration curve.

The term processor, as used herein, refers to central processing units, microprocessors, microcontrollers, reduced instruction set circuits (RISC), application specific integrated circuits (ASIC), field programmable gate arrays (FPGAs), logic circuits, and any other circuit or processor capable of executing the functions described herein.

As used herein, the terms "software" and "firmware" are interchangeable, and include any computer program stored in memory for execution by processor 134, including RAM memory, ROM memory, EPROM memory, EEPROM memory, and non-volatile RAM (NVRAM) memory. The above memory types are exemplary only, and are thus not limiting as to the types of memory usable for storage of a computer program.

Controller 132 is programmed with sufficient instructions and algorithms to enable operation of gas temperature measurement system 102 as described herein. In general, multi-color pyrometry (MCP) algorithms are used to determine the gas temperature. In the exemplary embodiment, at least one of a linear least-squares multi-color pyrometry (LSMCP) method and a non-linear MCP method is used to determine temperatures. Alternatively, any other methods, including, without limitation, ratio-metric MCP, that enable operation of gas temperature measurement system 102 may be used.

Theoretical predictions for time response, spatial resolution, and radiation corrections due to thermal radiation, spatial deviations, and temporal deviations for the gas temperature measurement technique may be given by:

| Quantity | | Definitions | Proportional |
|---|---|---|---|
| $\tau$ | Time response | $\dfrac{\rho_f c_f d_f}{4 h_g}$ | $\tau \propto d_f^2$ |
| $\delta$ | Spatial resolution | $\sqrt{\dfrac{k_f d_f}{4 h_g}}$ | $\delta \propto d_f$ |
| $\Delta T$ | Radiation correction | $\dfrac{\epsilon_f \sigma}{h_g}(T_f^4 - T_\infty^4)$ | $\Delta T \propto d_f$ | where
Symbols
| | | |
|---|---|---|
| $c_f$ | J/(kgK) | specific heat of filament |
| $d_f$ | m | Diameter of filament |
| $h_g$ | W/(m²K) | Heat transfer coefficient of gas |
| $k_f$ | W/(mK) | Thermal conductivity of filament |
| $T_f$ | K | Temperature of filament |
| $T_g$ | K | Temperature of gas |
| $T_\infty$ | K | Temperature of surrounding environment |
| $\Delta T$ | K | Temperature correction [$\Delta T = T_g - T_f$] |
| $\epsilon_f$ | | Emissivity of filament |
| $\rho_f$ | kg/m³ | Density of filament |
| $\sigma$ | W/(K⁻⁴m²) | Stefan-Boltzmann constant, 5.6704 × 10⁻⁸ |

The LSMCP and non-linear MCP methods use Planck's law or Wien's law as derived from Planck's law to define a plurality of matrices (described below). Wien's law states:

$$-\frac{1}{T_R} = -\frac{1}{T} + \frac{\lambda}{C_2}\ln[\varepsilon(\lambda)], \quad \text{Eq. (1)}$$

where $T_R$ represents the radiance temperature of an object being monitored, in units of degrees Kelvin (° K), that is determined from the radiative intensity assuming a blackbody, i.e., an emissivity ($\epsilon$) value of unity (1), T represents the filament temperature to be determined in units of ° K, $\lambda$ represents the wavelength of the emitted thermal radiation from the object in units of nanometers (nm), and $C_2$ is the second radiation constant of 1.4388*10⁻² in units of meters-° K (m° K), and $\epsilon(\lambda)$ represents the unitless emissivity of the object as a function of the emitted thermal radiation wavelength. With determined values for $\lambda$, $\epsilon(\lambda)$, and $T_R$, a temperature of the filament may be determined by using intensities measured a predetermined wavelengths in equation (1) above within controller 132.

The logarithmic function of emissivity as a function of wavelength, i.e., ln [$\epsilon(\lambda)$], in equation (1) above, for thin filaments, as described herein, often exhibits a polynomial dependence on the wavelength $\lambda$. Therefore, a polynomial expression with an "M−2" order may be used to facilitate fitting the emissivity $\epsilon(\lambda)$ in equation (1) as:

$$\ln[\varepsilon(\lambda)] = C_2 \sum_{i=1}^{M-1} a_i \lambda^{i-1}. \quad \text{Eq. (2)}$$

For N-color pyrometry, equation 2 may be expressed as:

$$Y = A^*X, \quad \text{Eq. (3)}$$

where Y is a known vector of size N*1 and X is an unknown vector of size M*1 which may be expressed as:

$$Y = \begin{bmatrix} y_1 \\ y_2 \\ y_3 \\ \vdots \\ y_N \end{bmatrix}, \text{ and } X = \begin{bmatrix} a_0 \\ a_1 \\ a_2 \\ \vdots \\ a_{M-1} \end{bmatrix},$$

where A is a coefficient matrix of the size N*M that may be expressed as:

$$A = \begin{bmatrix} 1 & \lambda_1 & \lambda_1^2 & \ldots & \lambda_1^{M-1} \\ 1 & \lambda_2 & \lambda_2^2 & \ldots & \lambda_2^{M-1} \\ 1 & \lambda_3 & \lambda_3^2 & \ldots & \lambda_3^{M-1} \\ \vdots & \vdots & \vdots & & \vdots \\ 1 & \lambda_N & \lambda_N^2 & \ldots & \lambda_N^{M-1} \end{bmatrix},$$

where $y_j = -1/(T_R)_j$ at wavelength $\lambda_j$, and where j=1, 2, . . . , N, and $a_0 = -1/T$.

Solving equation 3, above, using the above matrices, for temperature T and emissivity $\epsilon(\lambda)$ generates the solution:

$$\begin{cases} T = -1/a_0 \\ \varepsilon(\lambda_j) = \exp\left(C_2 \sum_{i=1}^{M-1} a_i \lambda_j^{i-1}\right) \end{cases} \text{ where } j = 1, 2, \ldots, N \quad \text{Eq. (4)}$$

In the event that the number of unknowns is less than the number of wavelengths, equation (3) is an over-determined system. Under such circumstances, the LSMCP method is used to determine temperature and emissivity in a closed-form solution. Here, a solution X is determined which facilitates minimizing the associated Euclidean norm ‖Y-AX‖, i.e., $L^2$ norm. The solution X is unique since the detection wavelength bands are different. The solution X is determined by solving the normal equations represented by:

$$A^T*Y=(A^T*A)*X, \quad \text{Eq. (5)}$$

where matrix $A^T$ is the transpose of the matrix A.

In some embodiments, the values for emissivity are held constant, based on, for example, and without limitation, empirical data. For those situations where emissivity is held constant using a LSMCP method, equation (2) is simplified to:

$$\ln\left[\varepsilon(\lambda)\right]=C_2 a_1, \quad \text{Eq. (6)}$$

and the solution for temperature and emissivity is:

$$\begin{cases} T = -1/a_0 \\ \varepsilon(\lambda_i) = \exp(C_2 a_1), \text{ where } i = 1, 2, \ldots, N \end{cases} \quad \text{Eq. (7)}$$

In some embodiments, the values for emissivity are linear, based on, for example, and without limitation, empirical data. For those situations where emissivity is linear using a LSMCP method, equation (2) is simplified to:

$$\ln\left[\varepsilon(\lambda)\right]=C_2(a_1+a_2\lambda_i), \text{where } i=1,2,\ldots,N, \quad \text{Eq. (8)}$$

and the solution for temperature and emissivity is:

$$\begin{cases} T = -1/a_0 \\ \varepsilon(\lambda_i) = \exp(C_2(a_1+a_2\lambda_i), \text{ where } i = 1, 2, \ldots, N \end{cases} \quad \text{Eq. (9)}$$

Alternatively, the non-linear MCP method may be used to generate solutions through an iterative method. Use of the algorithms described above facilitates increasing the accuracy of temperature measurements by reducing the effects of contamination on optical component 126 that may affect transmission, and measuring emissivity to decrease the effects of variable emissivity on temperature measurements.

As shown in the exemplary embodiment, gas temperature measurement system 102 monitors one or more temperatures of the gases passing through turbine 106 of gas turbine engine system 101. Alternatively, gas temperature measurement system 102 may be used to measure gas temperatures associated with other portions of gas turbine engine system 101, including, without limitation, any portion of air intake 114, compressor 104, combustor 110, and exhaust section 119.

FIG. 2 is a side cross-sectional view of a portion of gas turbine engine system 101 in accordance with an exemplary embodiment of the present system. In the exemplary embodiment, FIG. 2 illustrates using gas temperature measurement system 102 to measure gas temperature at a compressor outlet 202, a combustor inlet 204, a combustor exit 206, an S1N location 208, and at inter-stages 210 of turbine 106, and inside or at the exit 212 of one or more nozzles 214 and exhaust 215. In alternative embodiments, gas temperature measurement system 102 can be used to measure gas temperatures in other positions of gas turbine engine system 101 not shown in FIG. 2, e.g., without limitation, air intake 114, compressor 104, exhaust section 119 (all shown in FIG. 1), and secondary flows (not shown) in gas turbine engine system 101. Combustor exit 206, S1N location 208, inter-stages 210, exit 212, nozzles 214, and exhaust 215 define a hot-gas path 220.

Figure 3:
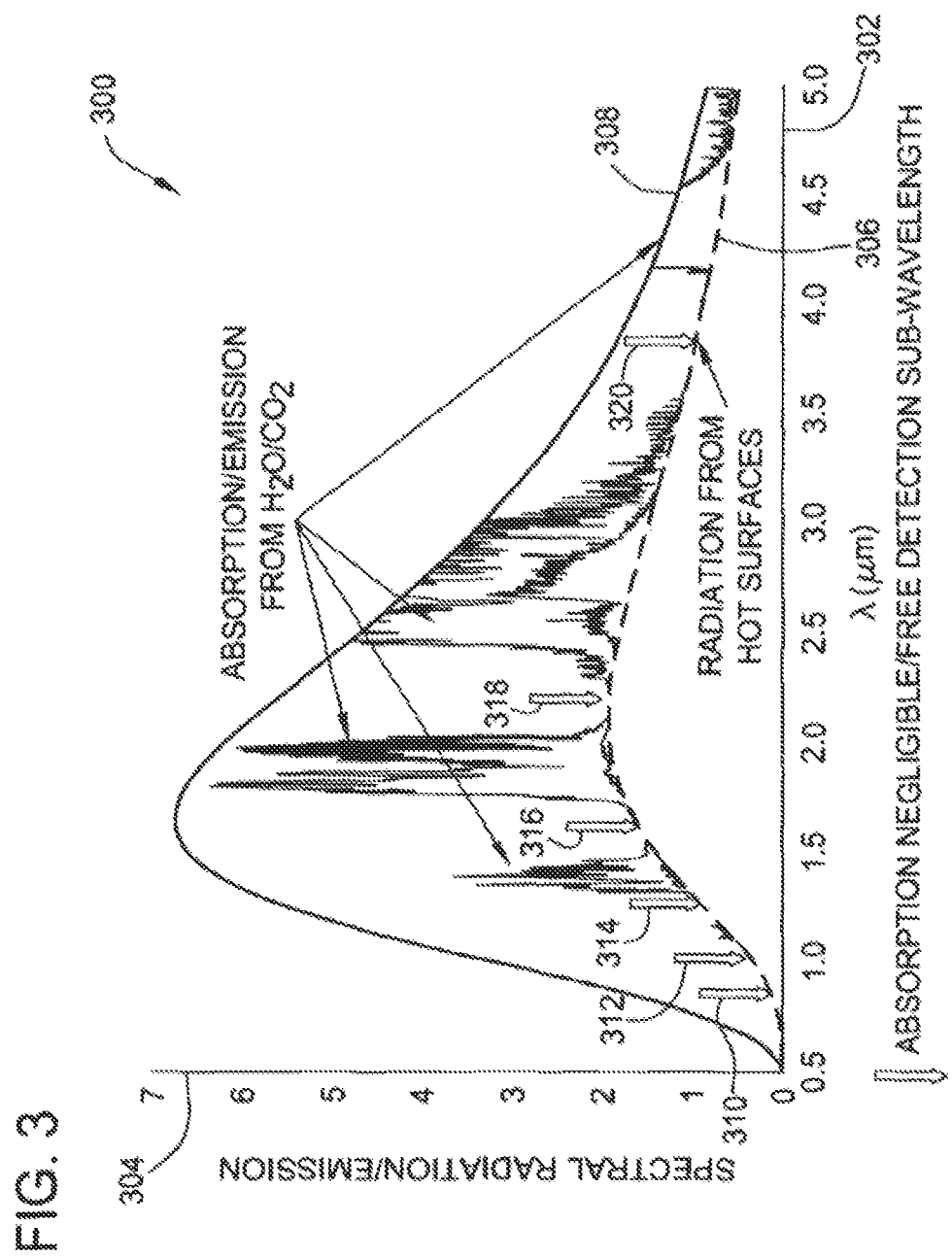
FIG. 3 is a graphical view of available substantially absorption/emission free wavelength bands that may be used with the gas temperature measurement system shown in FIG. 1.

FIG. 3 is a graphical view, i.e., a graph 300 of available substantially absorption/emission free wavelength bands that may be used with gas temperature measurement system 102 (shown in FIG. 1) for temperature profile measurements. In the exemplary embodiment, graph 300 includes an x-axis 302 graduated in units of wavelength expressed in μm. Graph 300 includes a y-axis 304 graduated in units of spectral radiation/emission. A first trace 306 indicates an amount of thermal radiation to be expected from hot surfaces within the gas path. A second trace 308 indicates a maximum thermal radiation expected from absorption/emission from water ($H_2O$) and carbon dioxide ($CO_2$) passing through the gas path.

The thermal radiation emitted from filaments 120 (shown in FIG. 1) is at least partially representative of the temperature of the filaments. Such radiative emissions are typically contained in a broad band of wavelengths that can be divided into expected, relatively narrower detection wavelength bands. For example, and without limitation, the relatively narrow wavelength bands of thermal radiation include at least one of a first wavelength band extending at least partially between approximately 400 nanometers (nm) and approximately 1300 nm, a second wavelength band extending at least partially between approximately 1500 nm and approximately 1800 nm, a third wavelength band extending at least partially between approximately 2000 nm and approximately 2500 nm, and a fourth wavelength band extending at least partially between approximately 2500 nm and approximately 4200 nm. Alternatively, any wavelength band, or portion thereof, may be used that enables operation of gas temperature measurement system 102 as described herein. Also, alternatively, any other measurements of the received thermal radiation that facilitate temperature determinations are used to enable operation of gas temperature measurement system 102 as described herein, including, without limitation, an amplitude determination.

Figure 4:
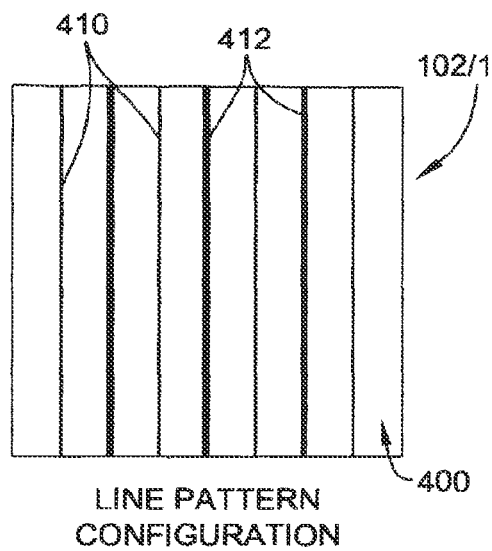
Figure 5:
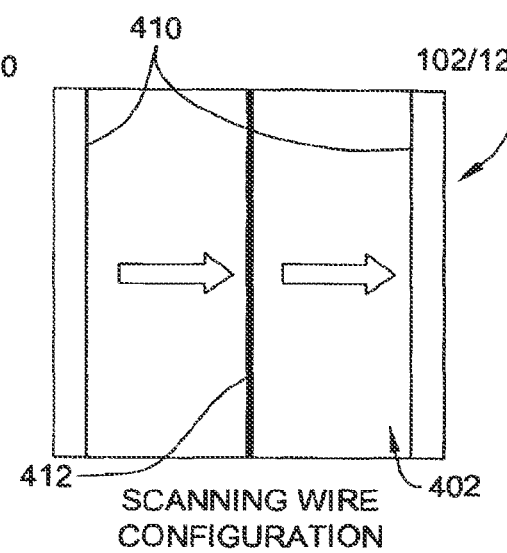
Figure 6:
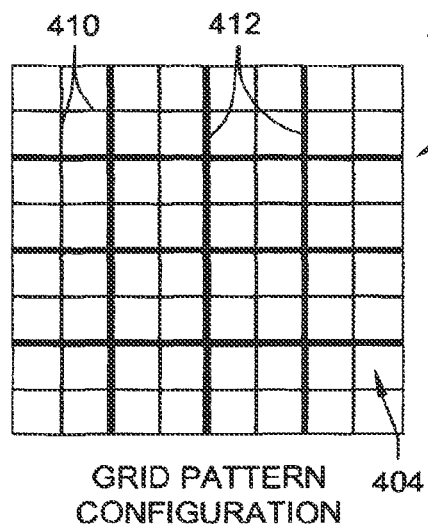
Figure 7:
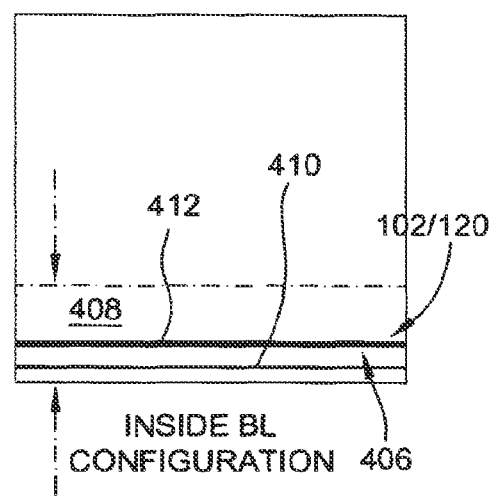

FIGS. 4, 5, 6, and 7 illustrate placement configurations of filaments 120 that may be used to achieve multiple spatial line temperature distributions within the gas temperature measurement system 102 (shown in FIG. 1). In the exemplary embodiment, FIG. 4 shows a configuration 400 of filaments 120 to determine measurements with a line pattern, FIG. 5 shows a configuration 402 of filaments 120 to determine measurements with a grid pattern, FIG. 6 shows a configuration 404 of filaments 120 for a field measurement by scanning the filament across the field, and FIG. 7 shows configuration 406 of filaments 120 that includes a plurality of filaments 120 inside a boundary layer 408, i.e., proximate a surface within gas turbine engine system 101 (shown in FIGS. 1 and 2). Filaments 120 may be integrated with other filaments used for other purposes.

In the exemplary embodiments of FIGS. 4, 5, 6, and 7, each of configurations 400, 402, 404, and 406, respectively, include two portions of filaments 120, i.e., a first portion 410 and a second portion 412. Each filament 120 of first portion 410 has a first filament diameter and each filament 120 of second portion 412 has a second filament diameter. The second filament diameter is greater than first filament diameter as shown with the different line weights. Alternatively, filaments 120 include any number of portions, each portion populated with any number of filaments 120 with a predetermined diameter, in any configuration that enables operation of gas temperature measurement system 102 as described herein.

Similarly, in the exemplary embodiment, each filament 120 of first portion 410 has a first filament emissivity and each filament 120 of second portion 412 has a second filament emissivity. In some embodiments, the second filament emissivity is different from the first filament emissivity. In other embodiment, the second filament emissivity is substantially similar to the first filament emissivity. Alternatively, filaments 120 include any number of portions, each portion populated with any number of filaments 120 with any combination of predetermined diameters and predetermined emissivities, in any configuration that enables operation of gas temperature measurement system 102 as described herein. The differing diameters and/or emissivities of filaments 120 may be used in cooperation to enhance temperature discrimination and mapping with gas temperature measurement system 102 as described herein The position of each filament is programmed into controller 132 (shown in FIG. 1). Also, based on testing of gas temperature measurement system 102, the photon intensity at each filament will vary and be recorded. Such photon intensities can be corroborated in real time using visual input from a detector array (not shown) associated with optical system 124 (shown in FIG. 1).

In addition, configuration 400 (only shown in FIG. 4) and configuration 406 (only shown in FIG. 7) are implemented through positioning a filament 120 of first portion of filaments 410 in close proximity with a filament 120 of second portion of filaments 412 such that they measure the temperatures in a similar predetermined spatial location. The ranges of distances separating filaments 410 and 412 are based on determinations of disturbance to fluid flow therethrough with established upper parameters, e.g., and without limitation, a 20% reduction in fluid flow.

Configuration 402 (only shown in FIG. 5) is implemented by scanning a filament 120 of first portion of filaments 410 substantially simultaneously with a filament 120 of second portion of filaments 412 such that they measure the temperatures substantially simultaneously.

Configuration 404 (only shown in FIG. 6) is implemented by positioning a plurality of filaments 120 of first portion of filaments 410 in close proximity with a plurality of filaments 120 of second portion of filaments 412 such that they define a grid pattern. Also, configuration 404 is implemented through measuring temperatures from a plurality of crisscrossing filaments 120 in each of portions 410 and 412 and subsequent correlation of the measurements.

FIG. 8 is an illustration 600 of a plurality of filament configurations for monitoring a 2D temperature field. In the exemplary embodiment, filament 120 (shown in FIG. 1) is coupled at each end such that a tension along a length of filament 120 is controllable. At a first tension 602, filament 120 is taut and traverses a substantially straight path between an upper connection point 604 and a lower connection point 606. At a second tension 608, less than the first tension, filament 120 is not taut and traverses an arcuate path between upper connection point 604 and lower connection point 606. At a third tension 610, less than the second tension, filament 120 is not taut and traverses a more arcuate path between upper connection point 604 and lower connection point 606. At a fourth tension 612, less than the third tension, filament 120 is not taut and traverses an even more arcuate path between upper connection point 604 and lower connection point 606. Filament controller 122 (shown in FIG. 1) is controllable manually, through controller 132 (shown in FIG. 1), or through an internal algorithm to effect the changes in tension needed for each particular operating situation. The internal algorithm uses inputs of both tension and filament length available.

FIG. 9 is a graph 700 showing exemplary calibration curves 706, 707, and 708 to convert the sensor signal to a temperature of filament 120 (shown in FIG. 1). Graph 700 includes a y-axis 702 representing a measured temperature divided into units of ° K extending between 800° K and 2200° K in increments of 200° K. Graph 700 also includes an x-axis 704 representing signal intensities divided into arbitrary intensity units extending between 0 and 1000 in increments of 200. The values of signal intensities plotted along x-axis 704 are at least partially based on a product of filament diameter and emissivity. As described above, filaments 120 may have any combination of similar diameters, different diameters, similar emissivities, and different emissivities.

Graph 700 further includes a first calibration curve 706 for a first filament from first portion 410 (shown in FIGS. 4-7) having the first diameter and/or the first emissivity. Graph 700 also includes a second calibration curve 707 for a second filament from second portion 412 (shown in FIGS. 4-7) having the second diameter and/or the second emissivity. Graph 700 also includes a third calibration curve 708 for a third filament from a third portion (not shown) having the third diameter and/or the third emissivity. Curves 706, 707, and 708 are generated through exposing filter samples of each filament to a laminar flat flame burner used to generate an accurate temperature reference having a substantially uniform temperature distribution and well characterized temperature accuracy at the temperature range of interest for calibration of filaments 120 (shown in FIGS. 4-7). Alternatively, any method of calibration of filaments 120 that enables operation of gas temperature measurement system 102 as described herein is used including, without limitation, calibration with a black body or oven with a similar temperature range as the temperature range of interest.

Determinations for temperatures as a function of filament diameters for the gas temperature measurement technique include determining:

$$T_g = T_f + \frac{\varepsilon_f \sigma}{h_g}(T_f^4 - T_\infty^4), \quad \text{Eq. (10)}$$

where $T_g$ represents the temperature of the gas in ° K, $T_f$ represents the temperature of the filaments in ° K and is determined from calibration curves 706 and 708, $\epsilon_f$ represents the unitless emissivity of the filaments, σ represents the Stefan-Boltzmann constant of $5.6704 \times 10^{-8}$ W/($K^{-4}m^2$), and $T_\infty$ represents the temperature of the surrounding environment in ° K. Also, $h_g$ represents the heat transfer coefficient of gas in W/($m^2K$) and may be expressed as:

$$h_g = Nu\frac{k_f}{d_f}, \quad \text{Eq. (11)}$$

and where $$Nu = CRe^m Pr^{0.37}, \quad \text{Eq. (12)}$$

where, Nu represents the kinematic viscosity in square meters per second (m2/s), C is a predetermined constant, Re represents the Reynold's number, m represents a curve fitting coefficient as a function of the Reynold's number, and Pr represents the Prndtl number. As such, $T_g$ may be represented by:

$$T_g = T_f + \varepsilon_f d_f \frac{\sigma}{k_f Nu}(T_f^4 - T_\infty^4). \quad \text{Eq. (13)}$$

In order to generate a simpler expression with two unknowns, $a=T_g$, $b=\sigma/[k_f C Pr^{0.37} (U/v)^m]$, where U represents a velocity of the gas in meters per second (m/s), v represents the dynamic viscosity in units of Pascal-seconds (PaS), and, $c=T_\infty$, $y=T_f$, and $x=\varepsilon_f d_f^{1-m}$, and once the substitutions are made:

$$y = \frac{a - x}{b(x^4 - c)}, \quad \text{Eq. (14)}$$

where, if $c=T_\infty$ is known, equation (14) only needs to be solved for x and y, where a is the gas temperature $T_g$. Therefore, to solve for the two unknowns x and y, two equations are needed. Such equations may be provided using filaments of two different diameters and/or a thin wire with a different emissivity, i.e., two values of $y=\varepsilon_f d_f^{1-m}$. As such, the values of $y=T_f$ are then determined.

FIG. 10 is a graph 800 showing an exemplary linear method of calculating a temperature of a gas with varying filament diameters using gas temperature measurement system 102 (shown in FIG. 1). Graph 800 includes a y-axis 802 representing a measured filament temperature and an x-axis 804 representing diameters of the filaments. Graph 800 further includes a first point 806 corresponding to a first filament diameter $d_1$ and a first filament temperature $T_1$. Graph 800 also includes a second point 808 corresponding to a second filament diameter $d_2$ and a second filament temperature $T_2$. Graph 800 further includes a third point 810 corresponding to a third filament diameter $d_3$ and a third filament temperature $T_3$. The temperatures $T_1$, $T_2$, and $T_3$ up to $T_n$, where n is the total number of filaments used for this temperature determination, are calculated using equation (14) above. A substantially linear curve 812 is fitted through points 806, 808, and 810 such that an intersection with y-axis 802 at a point 814 is extrapolated. Point 814 represents the true gas temperature when the diameter of an imaginary filament is at zero. While curve 812 is shown as a straight line in the exemplary embodiment, curve 812 may have any shape that enables operation of gas temperature measurement system 102 as described herein, including, without limitation, parabolic.

In the exemplary embodiment, filaments 120 are approximately 5.0 millimeters (mm) or less in diameter, e.g., without limitation, in the range between approximately 10µ and approximately 4 mm in diameter. Alternatively, filaments 120 have any dimensions that enable operation of gas temperature monitoring system 102 as described herein.

FIG. 11 is a graph 820 showing an exemplary nonlinear method of calculating a temperature of a gas with varying filament diameters using gas temperature measurement system 102 (shown in FIG. 1). Graph 820 includes a y-axis 822 representing a measured filament temperature and an x-axis 824 representing diameters of the filaments. Graph 820 further includes a first point 826 corresponding to a first filament diameter $d_1$ and a first filament temperature $T_1$. Graph 820 also includes a second point 828 corresponding to a second filament diameter $d_2$ and a second filament temperature $T_2$. Graph 820 further includes a third point 810 corresponding to a third filament diameter $d_3$ and a third filament temperature $T_3$. The temperatures $T_1$, $T_2$, and $T_3$ up to $T_n$, where n is the total number of filaments used for this temperature determination, are calculated using equation (14) above. A nonlinear curve 832 is fitted through points 826, 828, and 830 such that an intersection with y-axis 822 at a point 834 is extrapolated. Point 834 represents the true gas temperature when the diameter of an imaginary filament is at zero. While curve 832 is shown as a parabolic curve in the exemplary embodiment, curve 832 may have any shape that enables operation of gas temperature measurement system 102 as described herein.

FIG. 12 is a graph 840 showing an exemplary linear method of calculating a temperature of a gas with varying filament emissivities using gas temperature measurement system 102 (shown in FIG. 1). Graph 840 includes a y-axis 842 representing a measured filament temperature and an x-axis 844 representing emissivities of the filaments. Graph 840 further includes a first point 846 corresponding to a first filament emissivity $\epsilon_1$ and a first filament temperature $T_1$. Graph 840 also includes a second point 848 corresponding to a second filament emissivity $\epsilon_2$ and a second filament temperature $T_2$. Graph 840 further includes a third point 850 corresponding to a third filament emissivity $\epsilon_3$ and a third filament temperature $T_3$. The temperatures $T_1$, $T_2$, and $T_3$ up to $T_n$, where n is the total number of filaments used for this temperature determination, are calculated using equation (14) above. A substantially linear curve 852 is fitted through points 846, 848, and 850 such that an intersection with y-axis 842 at a point 854 is extrapolated. Point 854 represents the true gas temperature when the emissivity of an imaginary filament is at zero. While curve 852 is shown as a straight line in the exemplary embodiment, curve 852 may have any shape that enables operation of gas temperature measurement system 102 as described herein, including, without limitation, parabolic.

In the exemplary embodiment, filaments 120 have an emissivity in the range between approximately 0.3 and approximately 1.0. Alternatively, filaments 120 have any emissivities that enable operation of gas temperature monitoring system 102 as described herein.

FIG. 13 is a graph 860 showing an exemplary nonlinear method of calculating a temperature of a gas with varying filament emissivities using gas temperature measurement system 102 (shown in FIG. 1). Graph 860 includes a y-axis 862 representing a measured filament temperature and an x-axis 864 representing emissivities of the filaments. Graph 860 further includes a first point 866 corresponding to a first filament emissivity $\epsilon_1$ and a first filament temperature $T_1$. Graph 860 also includes a second point 868 corresponding to a second filament emissivity $\epsilon_2$ and a second filament temperature $T_2$. Graph 860 further includes a third point 870 corresponding to a third filament emissivity $\epsilon_3$ and a third filament temperature $T_3$. The temperatures $T_1$, $T_2$, and $T_3$ up to $T_n$, where n is the total number of filaments used for this temperature determination, are calculated using equation (14) above. A substantially nonlinear curve 872 is fitted through points 866, 868, and 870 such that an intersection with y-axis 862 at a point 874 is extrapolated. Point 874 represents the true gas temperature when the emissivity of an imaginary filament is at zero. While curve 872 is shown as a parabolic curve in the exemplary embodiment, curve 872 may have any shape that enables operation of gas temperature measurement system 102 as described herein.

Referring to FIGS. 10, 11, 12, and 13, any combination of linear and nonlinear diameter methods with any combination of linear and nonlinear emissivity methods may be used that enables operation of gas temperature measurement system 102 as described herein.

FIG. 14 is a flow chart for a method 900 of generating a three-dimensional (3D) map of temperature in a volume of interest. Method 900 includes receiving 902 continuous broad wavelength thermal radiation emitted by thin filaments 120 with different diameters and/or emissivities via optical system 124. Method 900 also includes splitting 904 broad wavelength thermal radiation into multiple narrow wavelength bands via wavelength splitting device 128. Method 900 further includes receiving 906 the multiple narrow wavelength bands' thermal radiation and outputting a respective intensity map via at least one detector array 130. Method 900 also includes computing 908 a thin filament temperature map based upon the digital signals via numerical algorithms. Method 900 further includes correlating 910 the thin filament temperatures with different diameters and/or emissivities to get the true gas temperature map. Method 900 also includes projecting 912 the measured distributed temperature map to generate a 3D flow field of the volume of interest.

The gas temperature measurement systems described above include a method and systems of measuring temperature using thin filament pyrometry that provide a cost-effective and reliable means of monitoring process parameters in heretofore difficult areas of components that experience harsh environmental conditions. As such, the gas temperature measurement systems described above provide a cost-effective method for monitoring temperatures of components in high temperature and/or high pressure environments. Specifically, the devices, systems, and methods described above include temperature measuring filaments of varying diameters and/or emissivities distributed in a gas turbine engine. The devices, systems, and methods described above determine a temperature measurement for the plurality of filaments as a function of the associated diameters and/or emissivities and then correlate such temperature determinations to determine a gas temperature of the portion of the gas turbine engine associated with the filaments. Therefore, the devices, systems, and methods described above facilitate measuring two and three dimensional temperature maps of gas turbine hot gas path components during operation. In addition, the devices, systems, and methods described above facilitate calibrating the temperature sensors and generating accurate temperature indications without using emissivity correction factors.

The above-described embodiments of the disclosure may be implemented using computer programming or engineering techniques including computer software, firmware, hardware or any combination or subset thereof, wherein the technical effect is at least one of: (a) positioning one or more filaments in a flow path of a fluid; (b) splitting a continuous broadband wavelength of thermal radiation emitted by a plurality of filaments with different diameters and/or emissivities into a plurality of relatively narrow wavelength bands of thermal radiation, wherein a wavelength or amplitude of the emitted thermal radiation relates to a temperature of the filament; (c) receiving the emitted thermal radiation by a detector array; (d) generating electrical signals using the received thermal radiation; (e) computing temperature profiles based upon the digital voltage signals via numerical algorithms; (f) correlating temperatures associated with filaments with different diameters to get the true gas temperature profiles; (g) transforming the generated electrical signals to a temperature indication; and (h) mapping the measured distributed temperature profiles to generate a 3D profile.

Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Exemplary embodiments of gas temperature measurement systems for gas turbine engines are described above in detail. The gas temperature measurement systems, and methods of operating such systems are not limited to the specific embodiments described herein, but rather, components of systems and/or steps of the methods may be utilized independently and separately from other components and/or steps described herein. For example, the methods may also be used in combination with other systems requiring observation of temperatures in high temperature environments, and are not limited to practice with only the gas turbine engines as described herein. Rather, the exemplary embodiment can be implemented and utilized in connection with many other high temperature applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A temperature measurement system comprising:
   a plurality of filaments configured to emit thermal radiation in a relatively broad and substantially continuous wavelength band at least partially representative of a temperature of said plurality of filaments, wherein:
   at least a first portion of said plurality of filaments has at least one of a first diameter and a first emissivity; and
   at least a second portion of said plurality of filaments has at least one of a second diameter that is different from the first diameter and a second emissivity;
   an optical system configured to receive at least a portion of the thermal radiation emitted from said plurality of filaments, said optical system comprising a detector array configured to:
   generate first electrical signals at least partially representative of the thermal radiation received from said first portion of said plurality of filaments;
   generate second electrical signals at least partially representative of the thermal radiation received from said second portion of said plurality of filaments; and
   a controller communicatively coupled to said detector array, said controller configured to:
   transform the first electrical signals to a first temperature indication at least partially as a function of at least one of the first diameter and the first emissivity; and
   transform the second electrical signals to a second temperature indication at least partially as a function of at least one of the second diameter and the second emissivity.

2. The system in accordance with claim 1, wherein said controller is further configured to calculate a third temperature indication from the first temperature indication and the second temperature indication, wherein the third temperature indication is at least partially a function of a third diameter having a value of zero.

3. The system in accordance with claim 2, wherein the first, second, and third temperature indications are representative of a portion of at least one of a two-dimensional and a three-dimensional temperature map across a predetermined volume.

4. The system in accordance with claim 2, wherein the first temperature indication, the second temperature indication, and the third temperature indication have one of a linear relationship and a nonlinear relationship with each other.

5. The system in accordance with claim 1, wherein said controller is further configured to calculate a third temperature indication from the first temperature indication and the second temperature indication, wherein the third temperature indication is at least partially a function of a third emissivity having a value of zero.

6. The system in accordance with claim 5, wherein the third temperature indication is representative of a portion of at least one of a two-dimensional and a three-dimensional temperature map across a predetermined volume.

7. The system in accordance with claim 5, wherein the first temperature indication, the second temperature indication, and the third temperature indication have one of a linear relationship and a nonlinear relationship with each other.

8. The system in accordance with claim 1, wherein said first portion and said second portion of said plurality of filaments are proximate each other within a predetermined volume.

9. The system in accordance with claim 1, wherein the first diameter and the second diameter have values within a range between approximately 10 microns and approximately 5.0 millimeters.

10. The system in accordance with claim 1, wherein the first emissivity and the second emissivity have values within a range between approximately 0.3 and approximately 1.0.

11. The system in accordance with claim 1, wherein said plurality of filaments comprises at least one of silicon carbide, sapphire, fused silica, tungsten, graphite, and stainless steel.

12. The system in accordance with claim 1, further comprising a wavelength splitting device configured to split the thermal radiation emitted from said plurality of filaments into at least one relatively narrow wavelength band of thermal radiation, said detector array configured to receive the at least one relatively narrow wavelength band of thermal radiation, wherein said controller is further configured to determine a temperature of one or more of said plurality of filaments without correcting for absorption and emission of thermal radiation from water (H2O) and carbon dioxide (CO2).

13. The system in accordance with claim 12, wherein the at least one relatively narrow wavelength band of thermal radiation is a plurality of relatively narrow wavelength bands of thermal radiation, wherein said controller is further configured to determine a temperature of one or more of said plurality of filaments using multi-color pyrometry (MCP).

14. The system in accordance with claim 1, wherein the second emissivity is equal to the first emissivity.

15. The system in accordance with claim 1, wherein the second emissivity is different from the first emissivity.

16. A method of temperature measurement comprising:
   positioning a plurality of filaments in a flow path of a fluid, at least a first portion of the plurality of filaments has at least one of a first diameter and a first emissivity and at least a second portion of the plurality of filaments has a second diameter that is different from the first diameter and a second emissivity;
   positioning an optical system proximate the plurality of filaments;
   transmitting thermal radiation from the plurality of filaments to the optical system, the thermal radiation at least partially representative of a temperature of the plurality of filaments;
   generating first electrical signals at least partially representative of the thermal radiation received from the first portion of the plurality of filaments;

generating second electrical signals at least partially representative of the thermal radiation received from the second portion of the plurality of filaments;

transforming the first electrical signals to a first temperature indication at least partially as a function of at least one of the first diameter and the first emissivity;

transforming the second electrical signals to a second temperature indication at least partially as a function of at least one of the second diameter and the second emissivity; and transmitting the first and second temperature indications to a processor.

17. The method in accordance with claim 16 further comprising calculating a third temperature indication from the first temperature indication and the second temperature indication, wherein the third temperature indication is at least partially a function of a third diameter having a value of zero.

18. The method in accordance with claim 17, wherein calculating a third temperature indication from the first temperature indication and the second temperature indication comprises generating at least one of a two-dimensional and a three-dimensional temperature map across a predetermined volume.

19. The method in accordance with claim 16 further comprising calculating a third temperature indication from the first temperature indication and the second temperature indication, wherein the third temperature indication is at least partially a function of a third emissivity having a value of zero.

20. The method in accordance with claim 19, wherein calculating a third temperature indication from the first temperature indication and the second temperature indication comprises generating at least one of a two-dimensional and a three-dimensional temperature map across a predetermined volume.

21. The method in accordance with claim 16, wherein positioning a plurality of filaments in a flow path of a fluid comprises positioning the first portion and the second portion of the plurality of filaments proximate each other within a predetermined volume.

22. The method in accordance with claim 16, wherein positioning a plurality of filaments in a flow path of a fluid comprises:

coupling a first end of each filament of the plurality of filaments to a surface of a gas turbine component; and extending a second end of each filament of the plurality of filaments into a turbine engine gas path, wherein each filament of the plurality of filaments includes an elongate body extending between the first end and the second end.

23. A turbomachine comprising:

a combustor configured to generate a flow of combustion products;

a turbine downstream in serial flow communication with said combustor, wherein said combustor and said turbine at least partially define at least a portion of a gas path configured to channel the flow of combustion products;

a temperature measurement system positioned at least partially in said gas path, said temperature monitoring system comprising:

a plurality of filaments configured to emit thermal radiation in a relatively broad and substantially continuous wavelength band at least partially representative of a temperature of said plurality of filaments, wherein:

at least a first portion of said plurality of filaments has at least one of a first diameter and a first emissivity; and at least a second portion of said plurality of filaments has at least one of a second diameter that is different from the first diameter and a second emissivity;

an optical system configured to receive at least a portion of the thermal radiation emitted from said plurality of filaments, said optical system comprising a detector array configured to:

generate first electrical signals at least partially representative of the thermal radiation received from said first portion of said plurality of filaments;

generate second electrical signals at least partially representative of the thermal radiation received from said second portion of said plurality of filaments; and a controller communicatively coupled to said detector array, said controller configured to:

transform the first electrical signals to a first temperature indication at least partially as a function of at least one of the first diameter and the first emissivity; and transform the second electrical signals to a second temperature indication at least partially as a function of at least one of the second diameter and the second emissivity.

* * * * *